(12) United States Patent
Baiada et al.

(10) Patent No.: US 11,795,704 B2
(45) Date of Patent: Oct. 24, 2023

(54) METHOD FOR COVERING AND ACCESSING MATE LINES DURING BUILDING CONSTRUCTION

(71) Applicant: DUPONT SAFETY & CONSTRUCTION, INC., Wilmington, DE (US)

(72) Inventors: Thomas Matthew Baiada, Richmond, VA (US); Wazir Nobbee, Chesterfield, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 17/678,699

(22) Filed: Feb. 23, 2022

(65) Prior Publication Data

US 2022/0186505 A1 Jun. 16, 2022

Related U.S. Application Data

(62) Division of application No. 16/993,757, filed on Aug. 14, 2020, now Pat. No. 11,293,190.

(Continued)

(51) Int. Cl.
*E04F 19/04* (2006.01)
*E04B 2/02* (2006.01)
(Continued)

(52) U.S. Cl.
CPC ................ *E04F 19/04* (2013.01); *B32B 7/12* (2013.01); *E04B 1/68* (2013.01); *E04B 2/02* (2013.01);
(Continued)

(58) Field of Classification Search
CPC ....... E04F 19/04; E04F 19/022; E04F 19/062; B32B 7/12; B32B 2307/718; B32B 2307/724; B32B 2307/748; B32B 2607/00; B32B 7/06; B32B 15/085; B32B 17/10; B32B 2262/101; B32B 13/12; B32B 2262/067; B32B 5/26; B32B 2307/7265; B32B 7/05; B32B 21/08; B32B 2262/0253; B32B 3/04; B32B 5/022; B32B 13/14; B32B 15/14; B32B 21/02; B32B 21/10; B32B 21/14; B32B 27/12; B32B 27/32; B32B 2250/02; E04B 1/68; E04B 2/02; E04B 2001/2451; E04B 2002/0276; E04B 1/625; F16J 15/028; E04C 2/38
See application file for complete search history.

(56) References Cited

U.S. PATENT DOCUMENTS

| 3,468,086 | A | * | 9/1969 | Warner | E04D 3/351 52/173.1 |
| 3,694,976 | A | * | 10/1972 | Warshaw | E04D 13/151 52/472 |
| 4,493,175 | A | * | 1/1985 | Coppola, Jr. | E04D 5/12 52/410 |
| 5,031,374 | A | * | 7/1991 | Batch | E04D 3/3603 52/460 |

(Continued)

*Primary Examiner* — Phi D A

(57) ABSTRACT

A process for covering, protecting and providing access to mate lines during building construction comprising the steps of preparing a vertical and horizontal mate line closure flap, carrying out a vertical and horizontal mate line access process, carrying out a vertical and horizontal mate line closing process, repeating the vertical and horizontal mate line access and closing processes as required, and carrying out a vertical and horizontal mate line sealing process to complete the building weatherization.

1 Claim, 7 Drawing Sheets

Related U.S. Application Data

(60) Provisional application No. 62/901,929, filed on Sep. 18, 2019.

(51) Int. Cl.
*E04F 19/02* (2006.01)
*F16J 15/02* (2006.01)
*B32B 7/12* (2006.01)
*E04B 1/68* (2006.01)
*E04B 1/24* (2006.01)

(52) U.S. Cl.
CPC ........... *E04F 19/022* (2013.01); *F16J 15/028* (2013.01); *B32B 2307/718* (2013.01); *B32B 2307/724* (2013.01); *B32B 2307/748* (2013.01); *B32B 2607/00* (2013.01); *E04B 2001/2451* (2013.01); *E04B 2002/0276* (2013.01)

(56) References Cited

U.S. PATENT DOCUMENTS

| | | | | |
|---|---|---|---|---|
| 7,178,306 | B2* | 2/2007 | Fritz | E04D 5/148 52/409 |
| 7,810,296 | B1* | 10/2010 | Turku | E04D 12/002 52/518 |
| 9,562,174 | B2* | 2/2017 | Russell | B32B 7/06 |
| 9,771,703 | B1* | 9/2017 | Golding, Jr. | B32B 5/022 |
| 2005/0229524 | A1* | 10/2005 | Bennett | B32B 3/06 52/592.1 |
| 2008/0178557 | A1* | 7/2008 | Parsons | E06B 1/62 52/61 |
| 2010/0139178 | A1* | 6/2010 | Ehrman | B32B 7/12 52/309.3 |
| 2010/0281787 | A1* | 11/2010 | Jay | E06B 1/62 52/745.15 |
| 2017/0138040 | A1* | 5/2017 | Graft | E04B 1/80 |
| 2019/0316352 | A1* | 10/2019 | Brooks, III | B32B 7/06 |
| 2022/0170262 | A1* | 6/2022 | Lolley | B32B 27/34 |

* cited by examiner

METHOD FOR COVERING AND ACCESSING MATE LINES DURING BUILDING CONSTRUCTION

BACKGROUND OF THE INVENTION

Field of the Invention

This invention pertains to a method for covering and accessing mate lines during building construction.

Background

There is a trend for multi-story buildings such as hotels, hospitals and apartments' to be assembled from modules prefabricated off-site. Some of these modules have an exterior wall. Industry practice is for an exterior wall to comprise wall sheathing often of wood such as plywood, oriented strand board (OSB) or particle board and a vapor-permeable water-resistant barrier (WRB) sheet attached to the outer surface of the sheathing.

The joint between the modules in a building frequently has a gap between the two exterior faces. This gap is called a mate line and it provides access between adjacent modules to allow service lines such as plumbing, electrical conduits, HVAC ducts to be installed or inspections carried out. The WRB sheet also covers the mate line. These mate lines are exposed and then closed several times while completing the installation of services and many staple holes and wrinkles in the WRB are realized from the numerous cycles of closing and opening the WRB flaps that are covering the mate lines. This results in deterioration in the integrity and performance of the WRB sheet at the mate line.

There is a need therefore to provide a more effective solution to providing mate line access and closure without causing excessive deterioration in the WRB flap that covers the mate line.

BRIEF SUMMARY OF THE INVENTION

This invention pertains to a process for covering, protecting and providing access to mate lines during building construction comprising the steps of:
preparing a vertical and horizontal mate line closure flap,
carrying out a vertical and horizontal mate line access process,
carrying out a vertical and horizontal mate line closing process,
repeating the vertical and horizontal mate line access and closing processes as required, and
carrying out a vertical and horizontal mate line sealing process to complete the building weatherization.

DETAILED DESCRIPTION OF THE INVENTION

Building Modules

Figure 1:
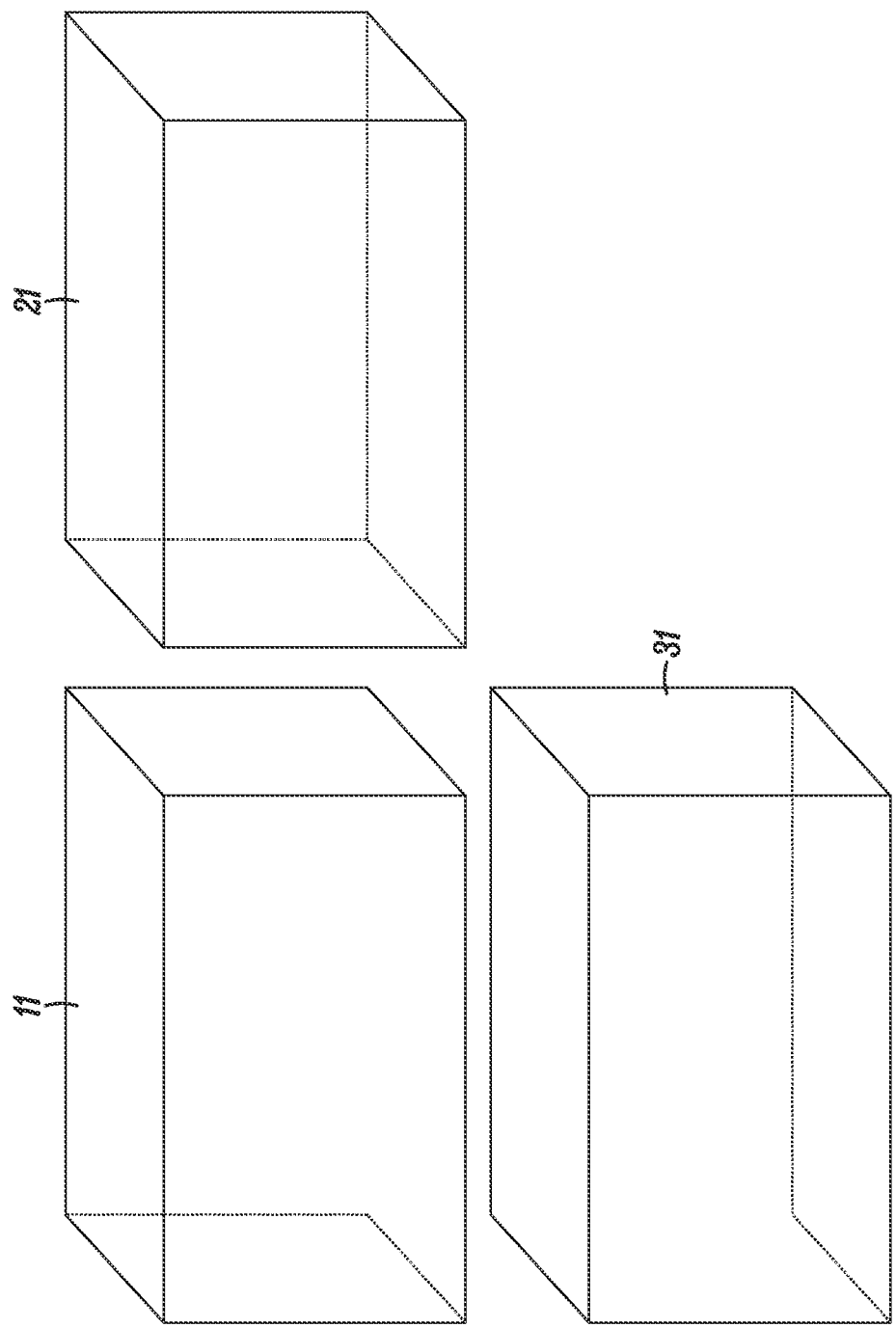
FIG. 1 shows a general view of building modules.

FIG. 1 shows a general view of the spatial arrangement of three building modules 11, 21 and 31, also referred to herein as first, second and third building modules respectively. Modules 11 and 21 are positioned in a horizontal relationship with respect to each other while modules 11 and 31 are positioned in a vertical relationship with respect to each other.

Figure 6:
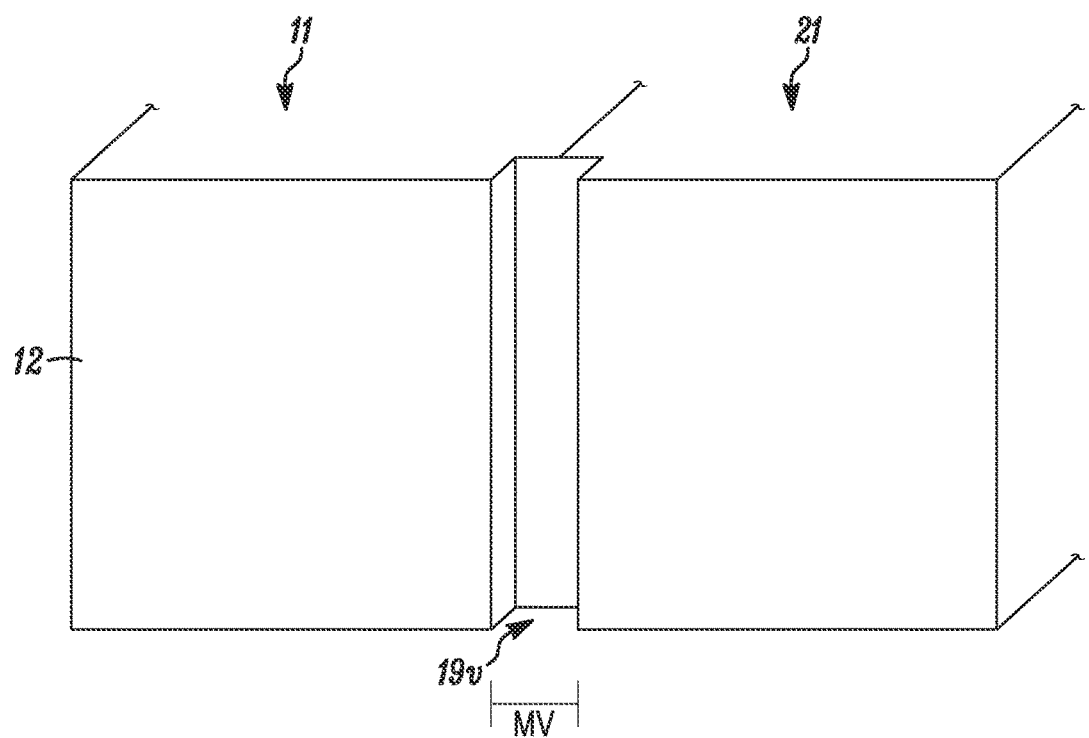
FIG. 6 shows a vertical mate line between two building modules.

FIG. 6 is another view of modules 11 and 21. Although the two modules are connected, this connection is broken at the front of the modules to accommodate vertical mate line $19_v$. The mate line has a width MV.

Figure 7:
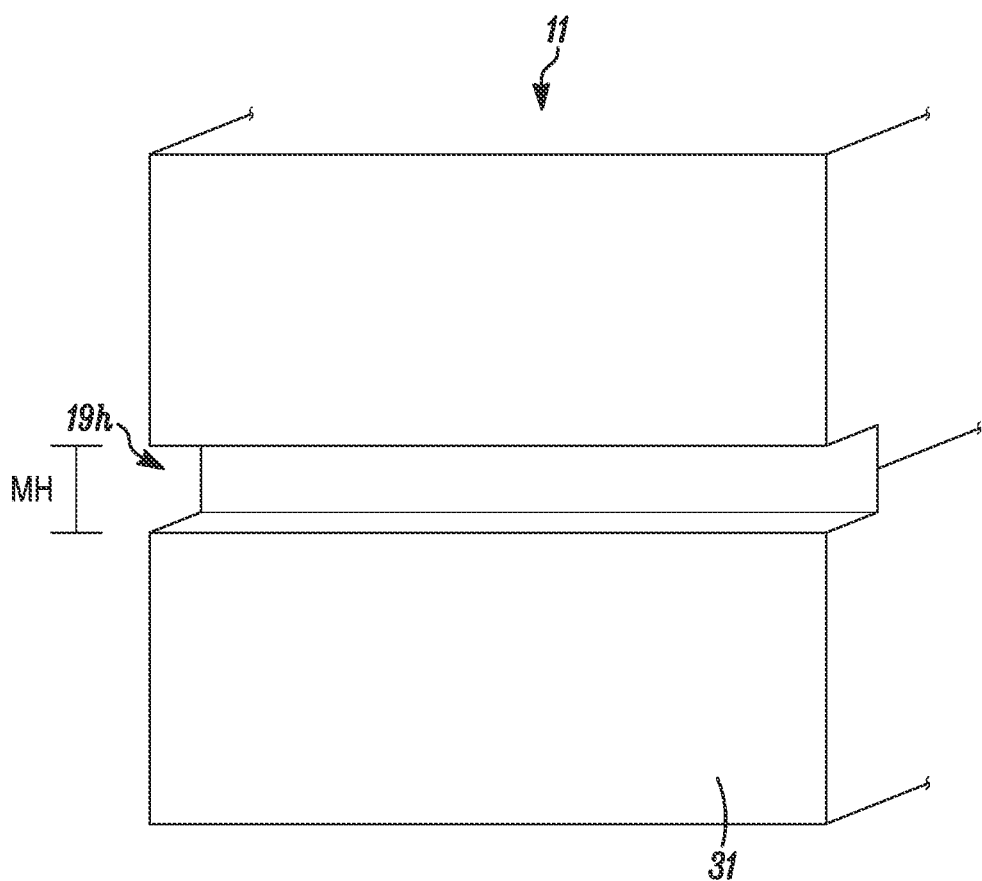
FIG. 7 shows a horizontal mate line between two building modules.

FIG. 7 is another view of modules 11 and 31 and in a similar way to FIG. 6 shows a horizontal mate lane $19_h$ having a width MH.

Vertical and Horizontal Mate Line Closure Flaps.

Figure 2:
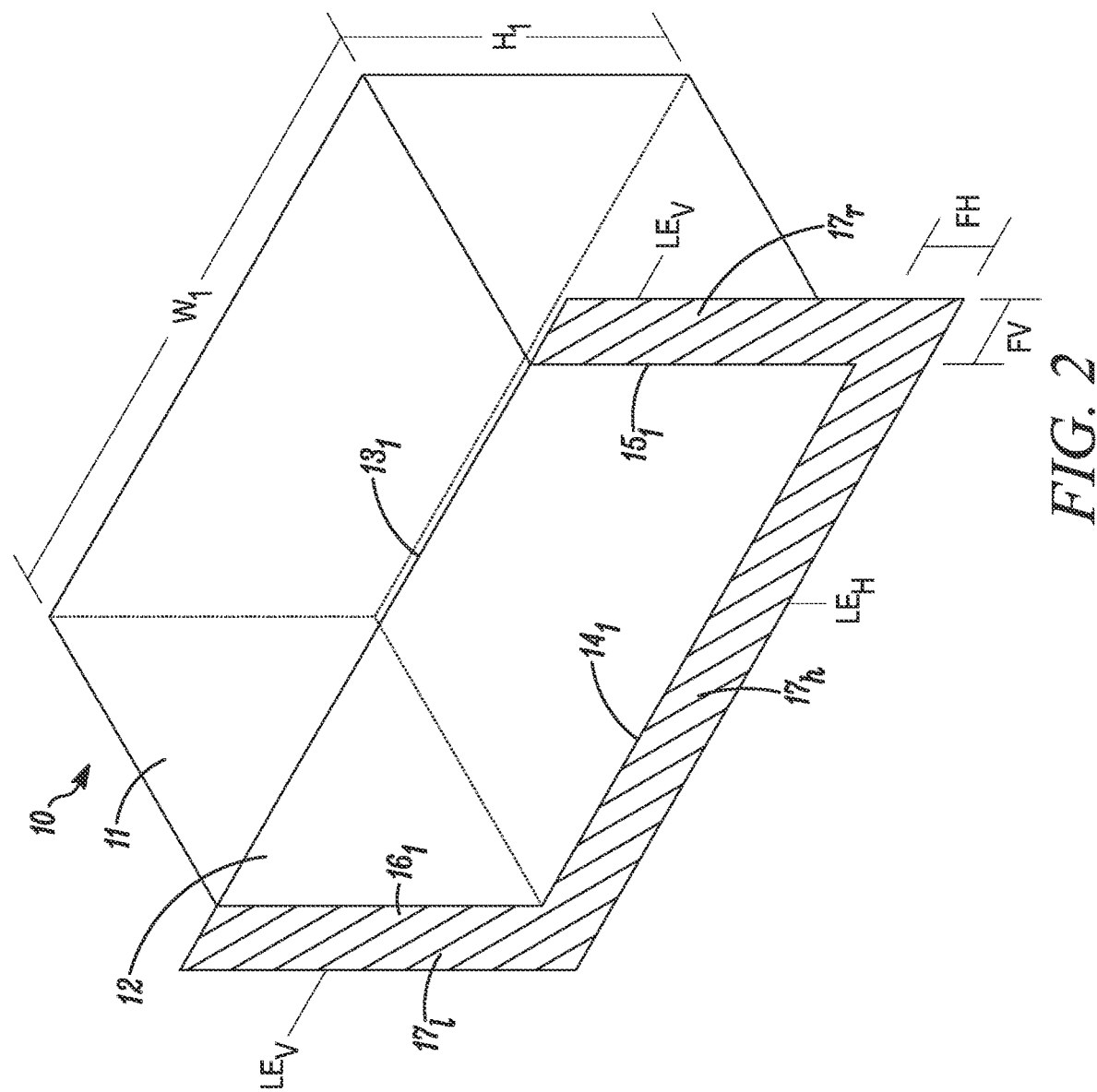
FIG. 2 is a perspective of a first building module.

FIG. 2 shows generally at 10 a view of building module 11, the first building module. The module has a height $H_1$ and width $W_1$. The module further has an external wall 12, a top edge $13_1$, a bottom edge $14_1$, a right vertical edge $15_1$ and a left vertical edge $16_1$. The external wall comprises sheathing having a WRB sheet affixed to and covering the entire outer surface of the sheathing.

FIG. 2, further shows WRB sheet flaps, a right vertical flap $17_r$, a left vertical flap $17_l$ and a horizontal flap $17_h$. The flaps also have longitudinal edges $LE_V$ for the vertical flaps and $LE_H$ for the horizontal flaps.

Figure 5:
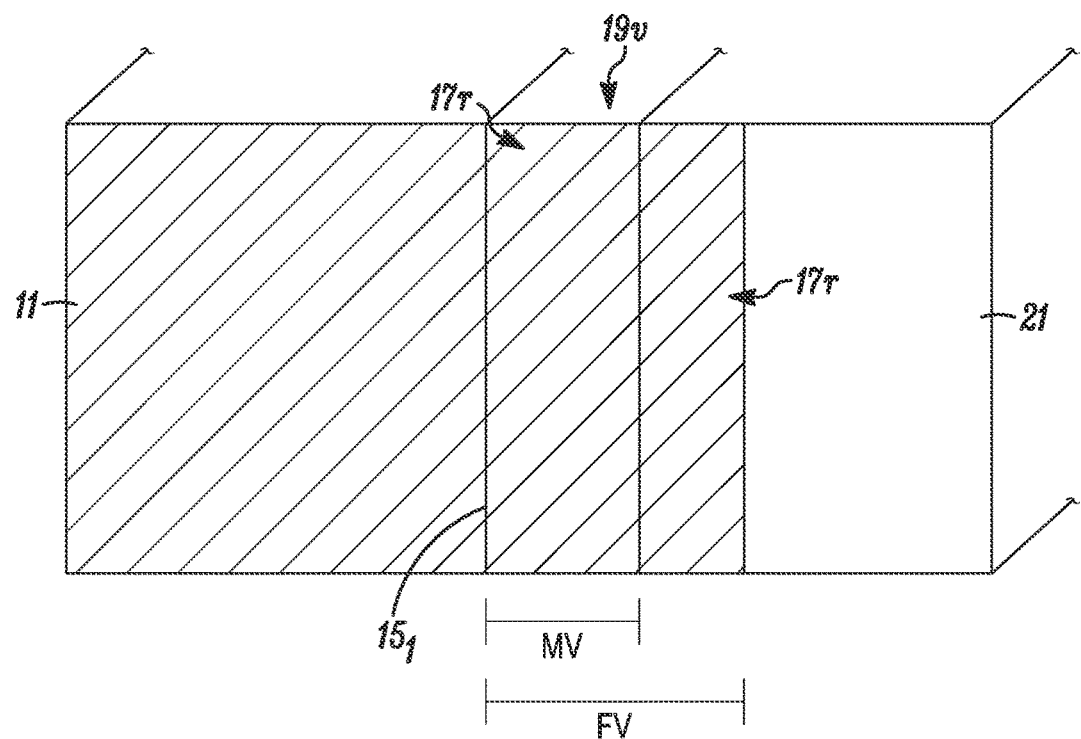
FIG. 5 shows a barrier flap extending from a first building module onto a second building module.

FIG. 5, shows a first module 11, a second module 21 and a vertical mate line space $19_v$ between the external faces of the two modules. The WRB sheet of the first module is shown hatched and further extends a distance FV beyond the right vertical edge $15_1$ of the first module to form a vertical flap $17_r$ covering the mate line and further extending over onto the WRB sheet of the second module. The distance FV is the width of the flap. Preferably, the distance FV exceeds the width MV of the vertical mate line to be covered by at least 152 mm or even by about 250 mm.

Referring again to FIG. 2, in a similar way, a vertical flap $17_l$ could also be formed for the other side of the module at the left vertical edge to cover any mate line in that location. A similar relationship between FV and MV applies here. In some embodiments, there may only be one vertical flap while in others there may be two.

Likewise, horizontal flap $17_h$ extends a distance FH (FIG. 2), the width of the flap, beyond the lower edge $14_1$ of the first module covering the horizontal mate line having a width MH (FIG. 7). Preferably, the distance FH exceeds the width MH of the horizontal mate line to be covered by at least 50 mm or by 101 mm or even by about 200 mm.

Water-Resistant Barrier Sheet

The water-resistant barrier (WRB) sheet is a sheet that does not allow movement of fluid through the sheet but does permit movement of vapor, such as water vapor. In some embodiments, the WRB sheet is polymeric. Preferred polymeric sheets are polyethylene (PE) or polypropylene (PP). A suitable polyethylene sheet is a nonwoven web of flash-spun plexifilamentary high-density PE (HDPE) fibers available from DuPont, Wilmington, Del. under the tradename TYVEK. A suitable polypropylene substrate is available from FiberWeb Inc., Old Hickory, Tenn. under the tradename TYPAR.

Support Member

Figure 3:
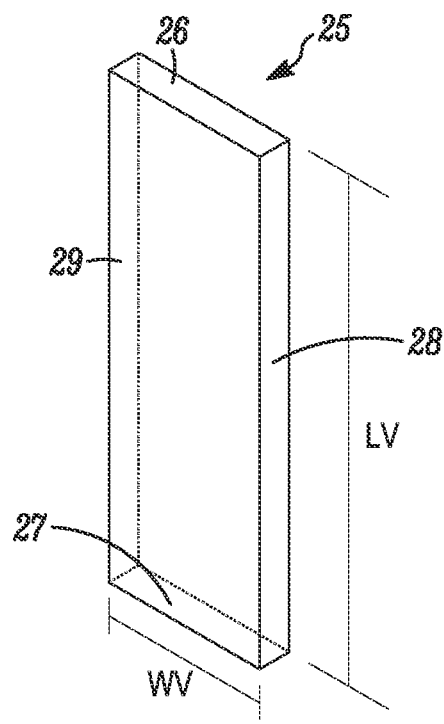
FIGS. 3 and 4 are respective views of embodiments of a vertical and horizontal support member.
Figure 4:
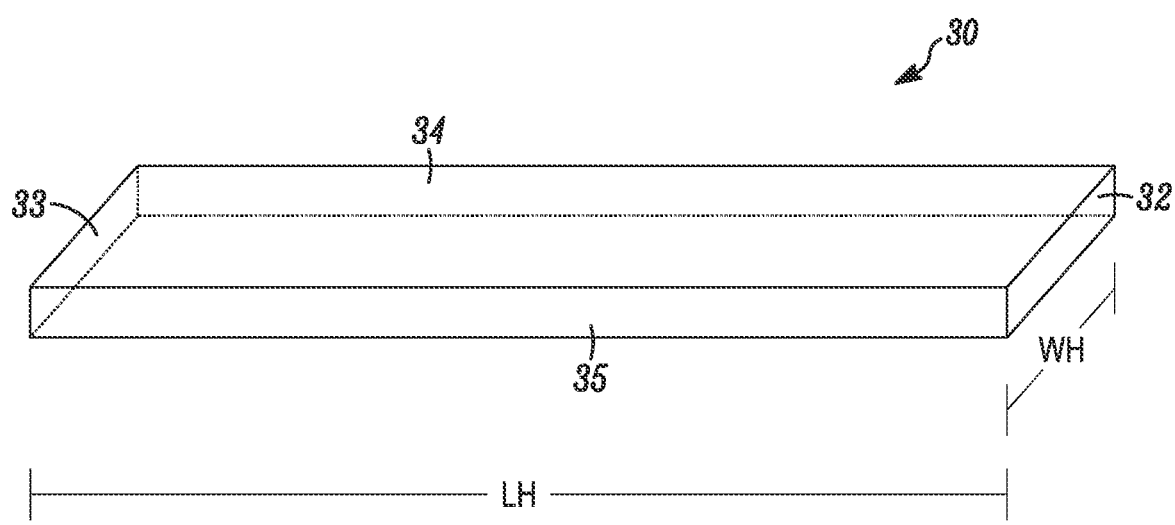

The support member is a rigid strip of material as exemplified in FIG. 3 for a vertical support member and in FIG. 4 for a horizontal support member. The material may be wood, fibrous, metallic or plastic. A fibrous support member may be natural or synthetic in origin.

A preferred material is wood in the form of a furring strip. In construction, furring strips are thin strips of wood, fiber or other material. "Furring" refers to the process of installing the strips and to the strips themselves. Furring strips are also known as battens and sometimes strapping. Preferably the furring strips described herein are wooden and have dimensions of about 25.4 mm thick and 25.4-76.2 mm wide. A preferred width is about 50 mm. Strip lengths may be up to about 2.5 m or greater.

In FIG. 3, a vertical support member is shown generally at 25 and has a length LV, a width WV, a first end 26, a second end 27, a first face 28 and a second face 29 wherein the length LV is no greater than the height $H_1$ of the first module. In some embodiments, the length LV of the vertical support member is between 80%-98% of the height $H_1$ of the first module. In some other embodiments, the length LV of the vertical support member is between 85%-95% of the height $H_1$.

In FIG. 4, the horizontal support member 30 has a length LH, a width WH, a first end 32, a second end 33, a first face 34 and a second face 35 wherein length LH is no greater than the width $W_1$ of the first module. In some embodiments, the length LH of the horizontal support member is between 80%-98% of the width $W_1$ of the first module. In some other embodiments, the length LV of the horizontal support member is between 85%-95% of the width $W_1$.

First Fastener

Fasteners such as screws, staples, nails, hook-and-loop, or adhesive are a suitable first fastener. A preferred adhesive is a tape. Hook-and-loop including hook-and-pile or touch fasteners consist of two components: typically, two lineal fabric strips (or, alternatively, round "dots" or squares) which are attached (sewn or otherwise adhered) to the opposing surfaces to be fastened. The first component features tiny hooks, the second features smaller loops. When the two are pressed together the hooks catch in the loops and the two pieces fasten or bind temporarily. When separated, by pulling or peeling the two surfaces apart, the strips make a distinctive "ripping" sound. An example of a hook-and-loop fastener is Velcro®. Preferred first fasteners are staples.

In a preferred embodiment, fasteners are located near the upper and lower ends of the vertical support members and near the left and right outer ends of horizontal support members. Further fasteners may be positioned at about 300 mm intervals between the upper and lower ends of the vertical support members and between the left and right outer ends of horizontal support members.

Second Fastener

Fasteners such as screws, staples, nails, hook and loop or adhesive are suitable as a second fastener. A preferred adhesive is a tape. Preferred fasteners are screws.

In a preferred embodiment, fasteners are located near the upper and lower ends of vertical support members and near the left and right outer ends of horizontal support members, and, if necessary, at intervals between the upper and lower ends of the vertical support members and between the left and right outer ends of horizontal support members.

Third Fastener

Fasteners such as screws, staples, nails, hook and loop or adhesive are suitable as a third fastener. A preferred adhesive is a tape. Preferred fasteners are screws.

In a preferred embodiment, fasteners are located near the upper and lower ends of vertical support members and near the left and right outer ends of horizontal support members, and, if necessary, at intervals between the upper and lower ends of the vertical support members and between the left and right outer ends of horizontal support members.

In some embodiments, the second and third fastener may be the same.

Fourth Fastener

A preferred fourth fastener is an adhesive tape such as DuPont Tyvek® tape. The tape covers the full length of the flap edge as well as the upper and lower edges of the flap.

Method of Preparing a Vertical Mate Line Closure Flap

Referring to FIGS. 1, 2, 5 and 6, preparation of the vertical mate line closure flap comprises the steps of:

providing a first building module 11 having an external wall 12, the first module having a height $H_1$, a width $W_1$, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FV beyond either the right or left vertical edges of the first module to form a vertical flap $17_r$ or $17_l$, the flap having a longitudinal edge $LE_V$, wherein the distance FV exceeds the width (MV) of the vertical mate line $19_v$ to be covered by at least 152 mm, providing a second building module 21 located in a horizontal direction to the side of the first module 11 and having a vertical mate line 19v between the two modules, the second module having a height, a width, a top edge, a bottom edge, a right vertical edge, a left vertical edge, the second module having an external wall wherein the external wall comprises sheathing having a synthetic WRB sheet affixed to and covering the entire outer surface of the sheathing, providing a vertical support member 25 having a length LV, width WV, a first end 26, a second end 27, a first face 28 wherein length LV is no greater than the height H1 of the first module, fully extending the vertical flap $17_r$ or $17_l$ of the first module 11 over onto the WRB sheet of the second module 21 thereby covering the vertical mate line 19v between the first and second modules and part of the WRB sheet of the second module, positioning the vertical support member 25 underneath the extended WRB flap such that the first face 28 of the vertical support member is flush with, or in close proximity to, the longitudinal edge $LE_v$ of the flap, and the first end 26 of the member does not extend beyond the top edge $13_1$ of the first module and the second end 27 of the member does not extend beyond the bottom edge $14_1$ of the first module, attaching the WRB sheet covering the vertical support member to the support member with a first fastener, and attaching the covered support member to the sheathing of the second module with a second fastener.

The WRB flap should be secured to the support member at each end and at about 300 mm intervals in between.

Method of Preparing a Horizontal Mate Line Closure Flap

Referring to FIGS. 1, 2 and 7, preparation of the horizontal mate line closure flap comprises the steps of:

providing a first building module 11 having an external wall 12, the first module having a height H1, a width W1, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FH beyond the bottom edge $14_1$ of the first module to form a horizontal flap $17_h$, the flap having a longitudinal edge $LE_H$, wherein the distance FH exceeds the width MH of the horizontal mate line $19_h$ to be covered by at least 50 mm, more preferably 101 mm, providing a third building module 31 located in a vertical direction below the first module 11, the third module having a height, a width, a top edge, a bottom edge, a right vertical edge, a left vertical edge, the third module having an external wall wherein the external wall comprises sheathing having a synthetic WRB sheet affixed to and covering the entire outer surface of the sheathing, providing a horizontal support member 30 having a length LH, width WH, a first end 32, a second end 33, a first face 34 wherein length LH is no greater than the width W1 of the first module, fully extending the horizontal flap $17_h$ of the first module 11 over onto the WRB sheet of the third module 31 thereby covering the horizontal mate line $19_h$ between the first and third modules and part of the WRB sheet of the third module, positioning the horizontal support member 30 underneath the extended WRB flap $17_h$ such that the first face 34 of the horizontal support member is flush with, or in close proximity to, the longitudinal edge $LE_H$ of the flap, and the first end 32 of the support member does not extend beyond the right vertical edge $15_1$ of the first module and the second end 33 of the support member does not extend beyond the left vertical edge $16_1$ of the first module, attaching the WRB sheet covering the horizontal support member to the support member with a first fastener, attaching the covered support member to the sheathing of the third module with a second fastener, The WRB flap should be secured to the support member at each end and at about 300 mm intervals in between.

Method of Accessing a Vertical Mate Line

Accessing the horizontal mate line comprises the steps of:
removing the fastener securing the horizontal support member to the sheathing of the third module,
folding the horizontal support member and WRB sheet back over the mate line so as to overlap the sheathing of the first module by a distance sufficient to expose the mate line, and
securing the covered support member to the sheathing of the first module by a third fastener.

Method of Accessing a Horizontal Mate Line

Accessing the horizontal mate line comprises the steps of:
removing the fastener securing the horizontal support member to the sheathing of the third module,
folding the horizontal support member and WRB sheet back over the mate line so as to overlap the sheathing of the first module by a distance sufficient to expose the mate line, and
securing the covered support member to the sheathing of the first module by a third fastener.

Method of Closing a Vertical Mate Line

Closing the vertical mate line comprises the steps of:
removing the fastener securing the vertical support member to the sheathing of the first module,
fully extending the vertical flap back over the mate line so as to cover the mate line, and
attaching the covered support member to the sheathing of the second module with a second fastener.

Where the vertical flap is at the corner of a building, the flap wraps around the corner and the vertical support member is secured in the same manner to the sheathing of the adjacent module.

Method of Closing a Horizontal Mate Line

Closing the horizontal mate line comprises the steps of:
removing the fastener securing the horizontal support member to the first module,
fully extending the vertical flap back over the mate line so as to cover it and
attaching the covered support member to the sheathing of the third module with a second fastener.

Repeated Opening and Closing of Mate Lines

The vertical and horizontal mate line access and closing processes are repeated as required during building work until all installations and inspections have been completed. When practical, the support member should be fastened in the same holes as previously used.

Method of Sealing a Horizontal Mate Line

Preferably, the horizontal mate line should be sealed before sealing the vertical flap. Carrying out the horizontal mate line sealing process to complete the building weatherization comprises the steps of:
removing the fastener used to secure the horizontal support member to the first or third module,
cutting the WRB flap along its length $LE_H$ close to the support member so as to free it from the support member,
ensuring the WRB flap covers the mate line and fully extends onto the surface of the third module, and
attaching the flap to the sheathing of the third module with a fourth fastener so as to seal all three edges of the flap.

All holes in the WRB sheet created by the various fasteners should be sealed by a water-resistant barrier tape such as DuPont Tyvek® tape.

Method of Sealing a Vertical Mate Line

Carrying out the vertical mate line sealing process to complete the building weatherization comprises the steps of:
removing the fastener used to secure the vertical support member to the first or second module,
cutting the WRB flap along its length $LE_V$ close to the support member so as to free it from the support member,
ensuring the WRB flap covers the mate line and fully extends onto the surface of the second module, and
attaching the flap to the sheathing of the second module with a fourth fastener so as to seal all three edges of the flap.

All holes in the WRB sheet created by the various fasteners should be sealed by a water-resistant barrier tape such as DuPont Tyvek® tape.

Horizontal Mate Line at Ground Level

In some circumstances there may also be a need for a mate line at ground level. In such a case and referring to FIG. 2, preparation of the horizontal mate line closure flap comprises the steps of providing a first building module 11 having an external wall 12, the first module having a height H1, a width W1, a top edge $13_1$, a bottom edge $14_1$, a right vertical edge $15_1$, a left vertical edge $16_1$, wherein the external wall comprises sheathing having a synthetic WRB sheet affixed to and covering the entire outer surface of the sheathing, the WRB sheet of the first module further extending a distance FH beyond the bottom edge $14_1$ of the first module to form a horizontal flap $17_h$, the flap having a longitudinal edge $LE_H$, wherein the distance FH exceeds the width MH of the horizontal mate line $19_h$ only to the extent necessary to cover the horizontal mate line and, if necessary, wrap the WRB flap around the horizontal support member prior to attaching it to the support member.

The support member is secured to the WRB flap with the first fastener as previously described and is then left hanging free to cover the horizontal mate line. Alternatively, the support member may be temporarily affixed to the building foundation.

Accessing the horizontal mate line comprises the steps of folding the horizontal support member and WRB sheet back over the mate line so as to overlap the sheathing of the first module by a distance sufficient to expose the mate line, and securing the support member to the sheathing of the first module by a third fastener.

Closing the horizontal mate line comprises the steps of removing the fastener securing the horizontal support member to the first module and allowing the support member to drop down and hang freely thus covering the mate line. Alternatively, the support member may be temporarily affixed to the building foundation.

The horizontal mate line sealing process to complete the building weatherization at ground level comprises the steps of:

removing the fastener used to secure the horizontal support member to the first module, cutting the WRB flap along its length $LE_H$ close to the support member so as to free it from the support member, trimming the WRB flap to size such that it fully covers the mate line, and sealing the end of the flap to the foundation flashing or to concrete. Suitable sealing means include self-adhesive tape, flashing tape, a sealant or caulk.

Window and Door Openings

Figure 8:
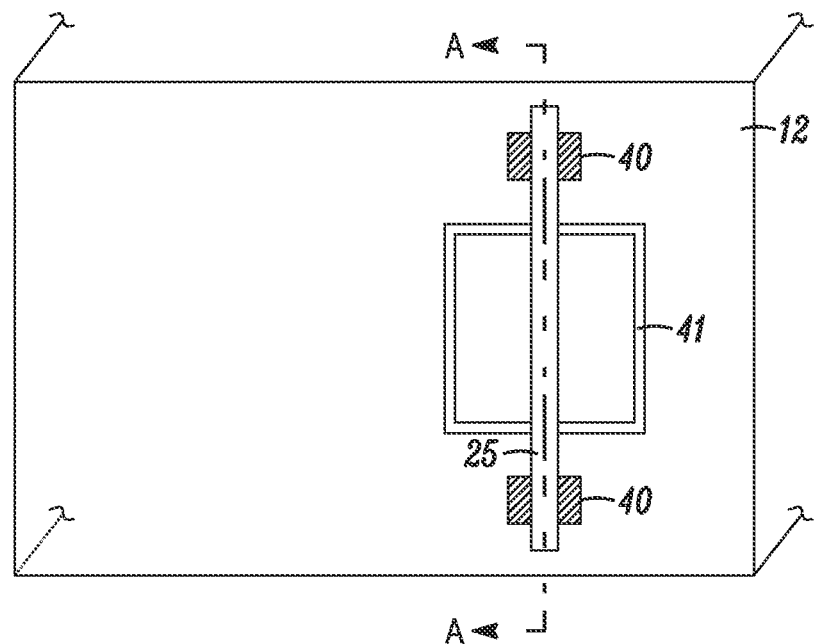
FIGS. 8-10 are views of support members positioned over building windows.
Figure 9:
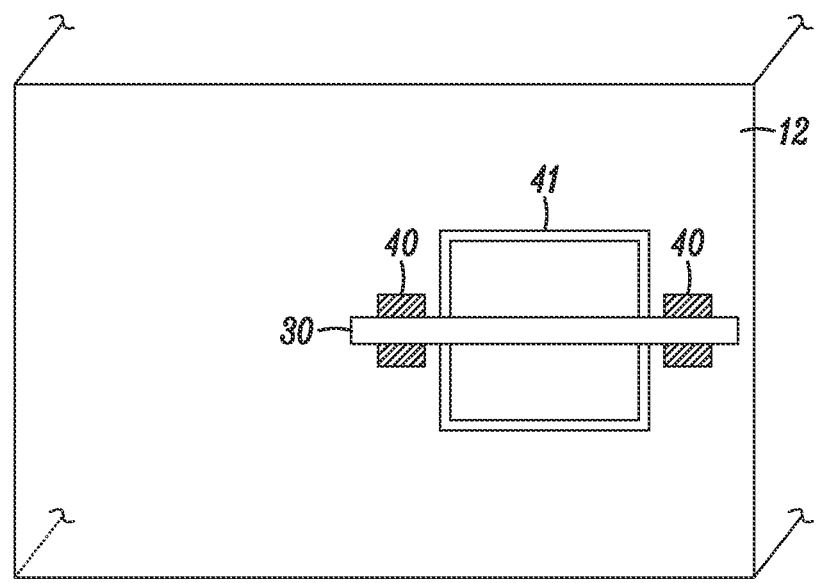
Figure 10:
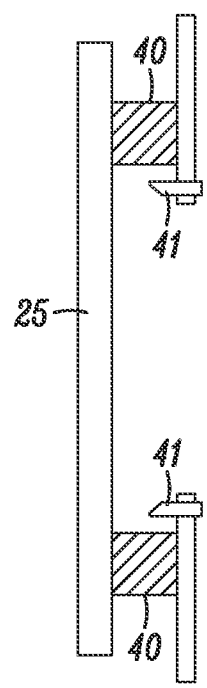

In some embodiments, the external wall has an opening for a window or door. In many cases, the sills of the window or door jambs extend beyond the plane of the WRB covered sheathing and could interfere with the positioning of the support member and flap. To overcome this, spacer blocks, preferably of wood, are affixed to the sheathing and, preferably, positioned no less than about 150 mm either side of window sills or door jambs or about 230 mm from the head of window rough openings such that the blocks protrude beyond the window sills or door jambs to provide fixing points for either a vertical or horizontal support member. Additional folds of the flap may be required to ensure correct positioning of the support member. The support member and flap is then fastened to the spacer block. FIGS. 8 and 9 show a view of spacer blocks 40 with attached support members 25 or 30 for a vertical and horizontal flap respectively. For convenience the WRB flap is not shown. The window frame is shown at 41. FIG. 10 is a sectional view through AA of FIG. 8 and further illustrates the relationship of the window frame, the spacer blocks and the support member. A similar concept applies for door frames.

Module Assembly

Figure 11:
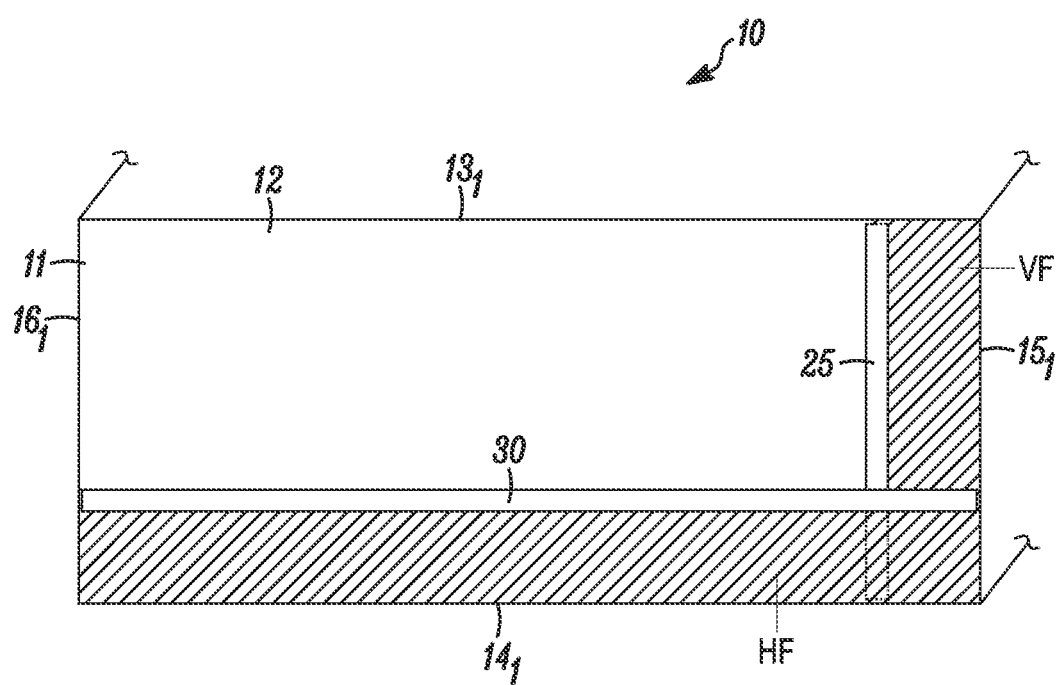
FIG. 11 is a view of one embodiment a "ready to ship" building module having mate line flaps attached to the sheathing of the module.

To facilitate shipping and on-site installation, some modules may have the support member attached to the WRB flap prior to leaving the module assembly site. FIG. 11 shows and example of this. The module 11 has an external wall 12, a top edge $13_1$, a bottom edge $14_1$, a right vertical edge $15_1$, and a left vertical edge $16_1$. The external wall comprises sheathing having a WRB sheet affixed to and covering the entire outer surface of the sheathing. The WRB sheet further comprises a vertical flap VF and a horizontal flap HF both shown as hatched in the figure. Vertical and horizontal support members 25 and 30 are attached to the outer edges of the vertical and horizontal flaps respectively by the first fastener. The vertical flap is folded back over the module sheathing and the support member attached to the sheathing by the second fastener. This process is then repeated for the horizontal flap.

We claim:

1. A building module comprising an external wall wherein the external wall further comprises sheathing having a vapor-permeable water-resistant (WRB) sheet affixed to and covering the entire outer surface of the sheathing, the WRB sheet further comprising a vertical flap and a horizontal flap, the outer edges of both flaps being attached to vertical and horizontal support members respectively by a first fastener wherein the support member and flaps are folded back to their full extent over the said WRB sheet affixed to and covering the entire outer surface of the sheathing of the building module and the support member further affixed to the said sheathing by a second fastener.

* * * * *